Primary Examiner—Norma S. Milestone
Attorneys—Joseph W. Molasky, J. Jerome Behan and I. Louis Wolk

[11] 3,627,721

[72] Inventor  Raymond A. Firestone
                Fanwood, N.J.
[21] Appl. No. 789,071
[22] Filed      Jan. 2, 1969
[45] Patented   Dec. 14, 1971
[73] Assignee   Merck & Co., Inc.
                Rahway, N.J.

[54] METHOD FOR THE PREPARATION OF (CIS-1,2-EPOXYPROPYL)PHOSPHONIC DIHALIDE
3 Claims, No Drawings

[52] U.S. Cl. .................................................. 260/348 R, 424/203
[51] Int. Cl. .................................................. C07d 9/42
[50] Field of Search ...................................... 260/348

United States Patent

ABSTRACT: A method for the preparation of (cis-1,2-epoxypropyl)phosphonic dihalide which comprises treating propylene oxide with phosphorus trihalide in the presence of a suitable oxidizing agent. The dihalide product thus obtained has utility as an intermediate inasmuch as it may be subjected to hydrolysis to afford the corresponding (cis-1,2-epoxypropyl)phosphonic acid or the salts thereof. The said (cis-1,2-epoxypropyl)phosphonic acid product and its salts are antibiotics which have utility in inhibiting the growth of gram-negative and gram-positive pathogenic bacteria.

A METHOD FOR THE PREPARATION OF (CIS-1,2-EPOXYPROPYL)PHOSPHONIC DIHALIDE

In accordance with this invention (cis-1,2-epoxypropyl)phosphonic dihalide is obtained by treating propylene oxide with a phosphorus trihalide in the presence of a suitable oxidizing agent. As a practical matter, it is only necessary to bring the propylene oxide, phosphorus trihalide and oxidizing agent into direct contact with each other; however, it will be apparent to those skilled in the art that the reaction may also be conducted in any suitably inert solvent in which the reactants are reasonably soluble as, for example, in benzene, hexane or chlorobenzene and the like. It is most desirable to bring the oxidizing agent into intimate contact with the propylene oxide and phosphorus trihalide reactants and this may be achieved by any one of several means as, for example, by vigorous stirring or by introducing a slow subsurface stream of gaseous oxygen through the mixture. The oxygen source may be gaseous oxygen, as already indicated, or, alternatively, may be any suitable oxygen-containing reagent as, for example, a diacylperoxide such as di-lower alkanoylperoxide as illustrated by diacetylperoxide or a di-lower alkylperoxide such as di-tertiary-butylperoxide. Temperature is not critical to the reaction but, in practice, the process is most advantageously conducted with cooling as, for example, by maintaining the reaction mixture at a temperature in the range of from about −40° C. up to about 20° C. However, it should be noted that certain of the more stable peroxides as, for example, the di-lower alkylperoxides, may actually require the application of higher temperatures. Thus, for example, when di-tertiary-butylperoxide in a suitable solvent such as chlorobenzene is employed temperatures of up to about 130° C. may be used. The following equation, wherein the oxidizing agent is gaseous oxygen, illustrates this method of preparation:

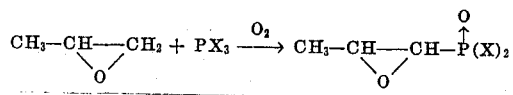

wherein $PX_3$ is a phosphorous trihalide such as phosphorus trichloride, phosphorus tribromide or phosphorus triiodide and the like and X is halo such as chloro, fluoro or iodo.

The (cis-1,2-epoxypropyl)phosphonic dihalides prepared according to this invention are useful as intermediates in the synthesis of ± and −(cis-1,2-epoxypropyl)phosphonic acid and its salts. The said products are antimicrobial agents which have utility in inhibiting the growth of gram-positive and gram-negative pathogenic bacteria. The (−) form and particularly the salts of (−) (cis-1,2-epoxypropyl)phosphonic acid such as the sodium and calcium salts, are active against Bacillus, Escherichia, Staphylococci, Salmonella and Proteus pathogens, and antibiotic-resistant strains thereof. Illustrative of such pathogens are *Bacillus subtilis, Escherichia coli, Salmonella schottmuelleri, Salmonella gallinarum, Salmonella pullorum, Proteus vulgaris, Proteus mirabilis, Proteus morganii, Staphylococcus aureus* and *Staphylococcus pyogenes*. Thus, (±) and (−) (cis-1,2-epoxypropyl)phosphonic acid and the salts thereof can be used as antiseptic agents to remove susceptible organisms from pharmaceutical, dental and medical equipment and can also be used in other areas subject to infection by such organisms.

In effecting the conversion of the instant (cis-1,2-epoxypropyl)phosphonic dihalides to (cis-1,2-epoxypropyl)phosphonic acid or its salts, it is only necessary to treat the former with a suitable hydrolyzing agent as, for example, with water or with an aqueous solution of an organic or inorganic acid or base. However, alkaline hydrolysis is particularly suitable inasmuch as it not only affords a method for the preparation of the pharmacologically active salts of (cis-1,2-epoxypropyl)phosphonic acid but, from a preparative standpoint, also serves to neutralize the hydrogen halide which is liberated during the reaction and which, under normal operating conditions, tends to attack the epoxide ring.

Suitable alkaline reagents include, for example, the alkali and alkaline earth metal carbonates, bicarbonates, oxides and hydroxides or organic bases and the like. Illustrative of such hydrolyzing agents are calcium oxide, calcium hydroxide, sodium hydroxide, potassium hydroxide, sodium bicarbonate, ammonium hydroxide, barium hydroxide, sodium carbonate, benzylamine, ethylamine, phenethylamine and the like.

The nuclear carbons comprising the epoxide ring in the dihalide products are asymmetric in character and, therefore, the said (cis-1,2-epoxypropyl)phosphonic dihalides may be obtained in the form of one or more of two optically active isomers. In this connection it should be noted that 1R:2S (cis-1,2-epoxypropyl)phosphonic acid dihalide is a preferred isomer inasmuch as it may be employed as an intermediate in the preparation of (−) (cis-1,2-epoxypropyl)phosphonic acid and its salts, which derivatives are particularly effective in inhibiting the growth of pathogenic bacteria.

The 1R:2S (cis-1,2-epoxypropyl)phosphonic dihalide referred to herein rotates plane-polarized light in a counter-clockwise direction (to the left as viewed by the observer) when the rotation of its disodium salt is measured in water (5 percent concentration) at 405mμ.

The designation cis used in describing the (cis-1,2-epoxypropyl)phosphonic dihalide compounds means that each of the hydrogen atoms attached to carbon atoms 1 and 2 of the propylphosphonic acid are on the same side of the oxide ring.

The following examples illustrate the method by which the racemic and optically active (cis-1,2-epoxypropyl)phosphonic dihalides of this invention may be obtained. However, the examples are illustrative only and should not be construed as being limited thereto since other functionally equivalent reagents may be substituted therefor to yield an identical (cis-1,2-epoxypropyl)phosphonic dihalide product.

EXAMPLE 1

(Cis-1,2-epoxypropyl)phosphonic Dichloride

Racemic propylene oxide (1 mole) and phosphorus trichloride (2 moles) are mixed and cooled to −20° C. A slow stream of oxygen is introduced subsurface with good dispersion while maintaining the temperature below 0° C. by regulating the oxygen flow. At the conclusion of the exothermic reaction the oxygen flow is discontinued and the produce is distilled, first at atmospheric pressure to remove unreacted starting materials and then at reduced pressure to fractionate racemic (cis-1,2-epoxypropyl)phosphonic dichloride from isomeric derivatives.

EXAMPLE 2

1R:2S (Cis-1,2-epoxypropyl)phosphonic Dibromide

By substituting optically active S-propylene oxide and phosphorus tribromide for the racemic propylene oxide and phosphorus trichloride recited in example 1 and following the procedure described therein, the product 1R:2S (cis-1,2-epoxypropyl)phosphonic dibromide is obtained.

By substituting phosphorus tribromide and phosphorus triiodide for the phosphorus trichloride recited in example 1 but otherwise following the procedure described therein, the racemic products (cis-1,2-epoxypropyl)phosphonic dibromide and (cis-1,2-epoxypropyl)phosphonic diiodide, respectively, are obtained.

The racemic and optically active (cis-1,2-epoxypropyl)phosphonic dihalides prepared according to this invention are conveniently converted to the corresponding racemic and optically active phosphonic acid and/or salt via the application of hydrolytic means. The following procedure illustrates this hydrolytic means:

Racemic (cis-1,2-epoxypropyl)phosphonic dichloride (0.1 mole) is added over 1 hour dropwise, with stirring, to cold water (100 ml. at 0°-2° C. and the pH of the solution is adjusted at once to 8.2 by the addition of dilute sodium hydroxide. An aqueous solution of calcium acetate monohydrate (0.1 mole) is then added and, after stirring for 1 hour while maintaining the solution at a pH of 8.2, the racemic calcium salt of (cis-1,2-epoxypropyl)phosphonic acid precipitates and is filtered and dried. The product thus obtained is an effective antimicrobial which inhibits the growth of pathogenic bacteria as, for example, the Bacillus, Escherichia, Staphylococci, Salmonella and Proteus pathogens.

In a manner similar to that described above for the preparation of racemic calcium (cis-1,2-epoxypropyl)phosphonate, optically active (cis-1,2-epoxypropyl)phosphonic dihalide starting material. Thus, for example, by substituting 1R:2S (cis-1,2-epoxypropyl)phosphonic dibromide product for the racemic (cis-1,2-epoxypropoly)phosphonic dichloride recited in the preceding paragraph and following the procedure described therein, the (−) calcium salt of (cis-1,2-epoxypropyl)phosphonic acid is obtained. The optically active product thus obtained is particularly effective as an antimicrobial in inhibiting the growth of pathogenic bacteria.

It will apparent from the foregoing description that the disclosed method for the preparation of racemic and optically active (cis-1,2-epoxypropyl)phosphonic dihalide constitutes a valuable contribution to the art. This artisan will also appreciate that the process disclosed in the above examples is merely illustrative and is capable of wide variation and modification without departing from the spirit of this invention.

What is claimed is:

1. A method for the preparation of racemic or optically active (cis-1,2-epoxypropyl)phosphonic dihalide which comprises treating the corresponding racemic or optically active propylene oxide with phosphorus trihalide in the presence of gaseous oxygen.

2. A method according to claim 1 for the preparation of 1R:2S (cis-1,2-epoxypropyl)phosphonic dihalide which comprises treating S-propylene oxide with phosphorus trihalide in the presence of gaseous oxygen at a temperature in the range of from about −40° C. up to about 20° C.

3. The method according to claim 2 wherein S-propylene oxide is treated with phosphorous tribromide at a temperature below 0° C. to afford 1R:2S (cis-1,2-epoxypropyl)phosphonic dibromide.

* * * * *